United States Patent [19]
Goheen

[11] Patent Number: 5,517,859
[45] Date of Patent: May 21, 1996

[54] END USER WATER DISTRIBUTION SYSTEM CONDITION TESTING APPARATUS

[76] Inventor: William D. Goheen, 721 E. 6th, Condordia, Kans. 66901

[21] Appl. No.: 216,470

[22] Filed: Mar. 22, 1994

[51] Int. Cl.⁶ .................................................... G01L 7/00
[52] U.S. Cl. .................................................... 73/756
[58] Field of Search .................. 73/756, 248, 861.47, 73/861.48; 364/464.04, 465

[56] References Cited

U.S. PATENT DOCUMENTS

| | | | |
|---|---|---|---|
| 2,024,752 | 12/1935 | Valentine | 73/31 |
| 2,108,272 | 2/1938 | Seyfarth | 73/109 |
| 2,372,606 | 3/1945 | Sammis | 73/168 |
| 2,394,987 | 2/1946 | Deming | 73/389 |
| 3,413,855 | 12/1968 | Bloom | 73/389 |
| 4,614,113 | 9/1986 | Daghe et al. | 73/201 |
| 4,672,728 | 6/1987 | Nimberger | 29/157 R |
| 4,838,865 | 6/1989 | Flank et al. | 73/756 X |
| 5,228,469 | 7/1993 | Otten et al. | 73/861.77 X |
| 5,357,792 | 10/1994 | Getenby | 73/756 X |

*Primary Examiner*—Richard Chilcot
*Assistant Examiner*—Elizabeth L. Dougherty
*Attorney, Agent, or Firm*—John R. Flanagan

[57] ABSTRACT

A water distribution system condition testing apparatus includes a pressure sensing body, a pressure measuring gauge and an one-way flow control actuating member. The pressure sensing body has an internal chamber and is connectable with the user's side of a meter setter which has an internal one-way flow control valve therein adapted to open in response to flow therethrough from an upstream source and to close in response to attempted flow therethrough from a downstream source. The pressure measuring gauge is mounted to the pressure sensing body in communication with the internal chamber thereof. The actuating member has a passageway therethrough to communicate with the internal chamber of the pressure sensing body. The actuating member is relocatable relative to the pressure sensing body between outer and inner displaced positions. At the outer position, the one-way flow control valve is forced open in response to attaching the pressure sensing body to the flow control valve so that testing of the user's water distribution system for a cross connection with a private water source can be performed. At the inner position, the one-way flow control valve remains closed in response to attaching the pressure sensing body to the flow control valve so that testing of the one-way flow control valve for backflow leakage can be performed.

20 Claims, 2 Drawing Sheets

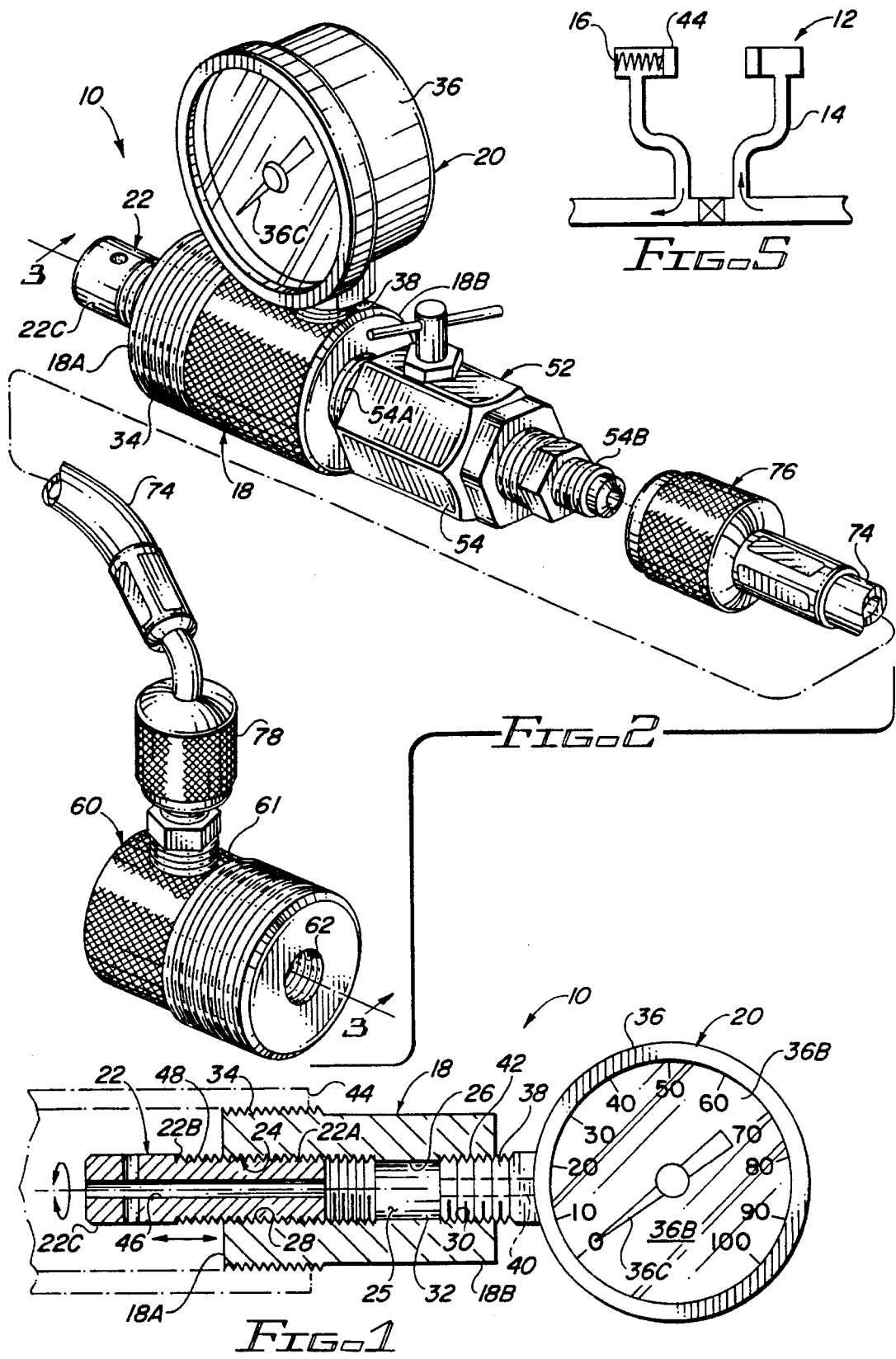

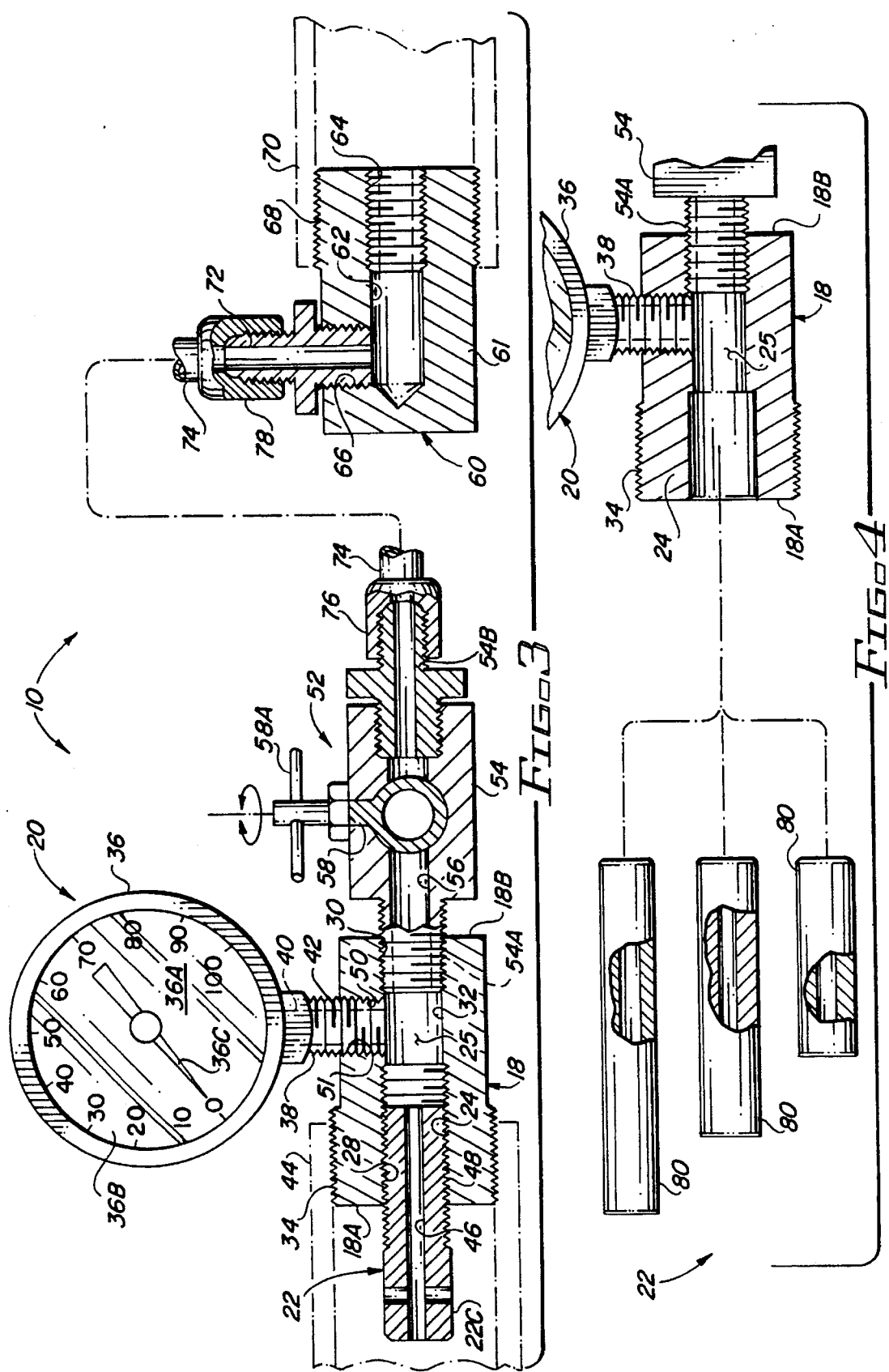

END USER WATER DISTRIBUTION SYSTEM CONDITION TESTING APPARATUS

BACKGROUND OF THE INVENTION

1. Field of the Invention

The present invention generally relates to prevention of cross connections by residential users between a public source of drinking water where quality of the water is regularly monitored and maintained and a private source of water of questionable quality, such as from a domestic water well, where monitoring and maintenance of quality are lacking. More particularly, the present invention is concerned with an apparatus used for testing the condition of an end user's water distribution system, particularly, to test the condition of a one-way flow control valve and to detect the presence of cross connections.

2. Description of the Prior Art

Legislation passed by the Federal Government regarding protection of the public sources of drinking water addresses the problem of cross connections between public water supplies and any other questionable sources at the sites of end users in an attempt to eliminate sources of contamination of public drinking water supplies. Manufactures have designed devices to prevent cross connections from occurring. For example, a single one-way flow control, or check, valve is typically installed on a user's water meter setter to prevent backflow of water to the public water supply from a private water source through a connection with the residential water distribution system downstream of the water meter setter.

The employment of an one-way flow control valve is an effective solution to the prevention of contamination should there be such cross connections present as long as the flow control valve functions as it is intended so as to only allow one-way flow from the public water supply to the residential water supply plumbing and not vice versa. However, as with any mechanical device, flow control valves can develop backflow leakage after prolonged periods of use.

Consequently, a need exists for ways and means to not only test for and detect the presence of cross connections but also to test the condition of flow control valves meant to prevent backflow at the location of a users' water meter setter.

SUMMARY OF THE INVENTION

The present invention provides an end user water distribution system condition testing apparatus designed to satisfy the aforementioned needs. The testing apparatus of the present invention is particularly suited to test the condition of the single one-way flow control valve and to detect the presence of cross connections. The testing apparatus of the present invention has a simple construction and is easy to use. The testing apparatus also is versatile in that it can be employed to perform several different tests so as to provide comprehensive monitoring of utility and residential water distribution systems.

Accordingly, the present invention is directed to a testing apparatus for use in testing the condition of a local water distribution system at a site of an end user. The testing apparatus is used between upstream and downstream sides of a meter setter which is connected at its upstream side to a public water supply and at its downstream side to the local water distribution system of the end user via a one-way flow control valve. The testing apparatus of the present invention comprises: (a) a pressure sensing body having an internal chamber for receiving and containing water under pressure, the body having external attachment means defined thereon and being adapted to attach the pressure sensing body in communication with the local water distribution system of the end user via the one-way flow control valve at the downstream side of the meter setter; (b) a pressure measuring gauge mounted to the pressure sensing body in communication with the internal chamber therein and being adapted to indicate the pressure of water received and contained therein; and (c) actuating means having a passage therethrough to provide communication between an end portion of the actuating means and the internal chamber of the pressure sensing body. The actuating means is relocatable between outer and inner positions relative to the pressure sensing body. With the actuating means located at the outer position an outer end thereof is adapted to force the one-way flow control valve from a closed state to an opened state in response to attaching the pressure sensing body to the one-way flow control valve. With the one-way flow control valve forced open, testing of the user's water distribution system for a cross connection with a private water source can be performed. If such cross connection is present, it will cause an increase in pressure of the water contained in the internal chamber of the pressure sensing body and a corresponding indication of the increased pressure by the pressure measuring gauge. On the other hand, with the actuating means located at the inner position the outer end thereof is adapted to leave the one-way flow control valve at the closed state in response to attaching the pressure sensing body to the one-way flow control valve. With the one-way flow control valve closed, testing of the one-way flow control valve for backflow leakage can be performed. If such backflow is occurring through the one-way flow control valve, it will also cause an increase in pressure of the water contained in the internal chamber of the pressure sensing body and a resultant indication of the increased pressure by the pressure measuring gauge.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a sectional view along an axial plane of a first embodiment of a water distribution system condition testing apparatus of the present invention.

FIG. 2 is a perspective view of a second embodiment of the testing apparatus of the present invention.

FIG. 3 is a sectional view along an axial plane of the second embodiment of the testing apparatus of FIG. 3.

FIG. 4 is a combined sectional and elevational view of an alternative form of an actuating means of the testing apparatus.

FIG. 5 is a simplified schematic view of a meter setter in an end user's water distribution system with the water meter being removed to provide the location at which the testing apparastus of the present invention is used to test the condition of the system.

DETAILED DESCRIPTION OF THE INVENTION

Referring to the drawings, and particularly to FIGS. 1 and 2, there is illustrated a testing apparatus of the present invention, generally designated 10, for use in testing the condition of a local water distribution system at the site of an end user. The testing apparatus 10 is employed at the location of a meter setter 12 which, as schematically illustrated in FIG. 5, is connected at its upstream side with a public water supply as represented by a conduit 14 and at its downstream side with the end user's local water distribution system as represented by a single one-way flow control valve 16. A water meter (not shown) at the meter setter 12 is temporary removed and replaced by the testing apparatus 10 of the present invention. Thus, the testing apparatus 10 is connected into the end user's local water distribution system via the one-way flow control valve 16 at the location of the end user's meter setter 12 where the testing apparatus 10 is employed to test the operating condition of the one-way valve 16 in preventing backflow leakage into the public water supply through the meter setter 12 and to test for and detect the presence of a cross connection within the end user's water distribution system between a private water source at the end user's site and the public water supply feeding into the end user's water distribution system through the meter setter 12. Also, the testing apparatus 10 can be used to perform other tests as part of making a comprehensive evaluation of the end user's local water distribution system.

Referring to FIG. 1, there is illustrated a first embodiment of the testing apparatus 10 of the present invention. The testing apparatus 10 basically includes a pressure sensing body 18, a pressure measuring gauge 20 and a one-way flow control valve actuating means 22. The pressure sensing body 18 of the testing apparatus 10 has an internal axial bore 24 defining an internal chamber 25 for holding water under pressure. The internal axial bore 24 is open at least at one, and preferably at both, of a pair of opposite ends 18A, 18B thereof. While the pressure sensing body 12 is illustrated in FIG. 1 having a cylindrical shape, however, alternatively, it can have other shapes. The internal axial bore 24 of the pressure sensing body 18 is defined by a continuous internal wall surface 26 having axially spaced first and second internal attachment means in the form of first and second sections of internal threads 28, 30 formed thereon extending from the open opposite ends 18A, 18B of the body 18 toward one another. The first and second sections of internal threads 28, 30 may merge into one another or an unthreaded section 32 of the wall surface 26 may be left between them. The pressure sensing body 18 also has an external attachment means in the form of a section of external threads 34 formed about the body 18 and extending a short distance from one end 18A thereof. The section of external threads 34 is adapted to attach the pressure sensing body 18 in communication with the one-way flow control valve 16 at the user's water distribution system side of the meter setter 12.

The pressure measuring gauge 20 of the testing apparatus 10 is mounted to the pressure sensing body 18 in flow communication with the internal axial bore 24 therein. More particularly, the pressure measuring gauge 20 includes an outer gauging mechanism 36 having a face 36A with a graduated scale 36B printed thereon and a pointer 36C adapted to rotate and point at a portion of the scale 36B representing the particular magnitude of the pressure measured by the gauge 20. The pressure measuring gauge 20 also includes an inner hollow stem 38 fixedly mounting the outer gauging mechanism 36 at the outer end of the inner stem 38 and having an internal passage 40 providing flow communication from the axial bore 24 of the pressure sensing body 18 to the outer gauging mechanism 36. The inner stem 38 has a section of external threads 42 adapted to be threaded with the second section of internal threads 30 formed in the axial bore 24 of the pressure sensing body 18 adjacent to the other end 18B thereof. In the first embodiment of the testing apparatus 10 shown in FIG. 1, the second section of internal threads 30 in the body 18 and the stem 38 of the gauge 20 and the section of external threads 42 thereon are oriented in coaxial relationship with the internal axial bore 24 of the pressure sensing body 18.

The section of external threads 34 on the pressure sensing body 12 adjacent to the one end 18A thereof is employed to provide a threaded connection with a coupling nut 44, being represented in dashed outline form, on the user's downstream side of the meter setter 12 having the one-way flow control valve 16. The one-way flow control valve 16, as is conventional and well-known, is internally biased and arranged to open to flow in only one direction. The one-way flow control valve 16 is oriented to open in response to flow therethrough from a pressurized source, in this case the pressurized public water supply, located upstream of the meter setter 12 and to close in response to any flow thereto from an opposite source, in this case a private water source cross connected at the user's site, located downstream of the meter setter 12.

As seen in FIG. 1, in one embodiment the one-way flow control valve actuating means 22 of the testing apparatus 10 is in the form of an elongated tubular spindle 22 having an axial passageway 46 defined therethrough to communicate with the internal chamber 25 defined by the axial bore 24 of the pressure sensing body 18. The tubular spindle 22 has an attachment means in the form of a section of external threads 48 formed about the body of tubular spindle 22 extending from an inner end 22A thereof to more than half of the length of the tubular spindle 22. The remaining unthreaded portion of the body of the tubular spindle 22 defines an annular shoulder 22B thereon which acts as a stop to further threading of the spindle 22 into the first section of internal threads 28 formed in the axial bore 24 of the pressure sensing body 18 from the one end 18A of the body 12. Thus, by rotating the tubular spindle 22 about the axis thereof and of the axial bore 24, the body of the spindle 22 can be axially extended from or retracted into, and thereby relocated relative to, the pressure sensing body 18 between an outer position, as shown in solid line form in FIG. 1, and an inner position, as shown in dashed line form in FIG. 1.

With the tubular spindle 22 located at the outer position, the outer end 22C thereof is extended a sufficient distance from the one end 18A of the presssure sensing body 18 to force the one-way flow control valve 16 from the closed state to the opened state in response to the act of attaching the pressure sensing body 18 to the one-way flow control valve 16 via the section of external threads 34 and the coupling nut 44. With the one-way flow control valve 16 forced open and permitting flow therethrough in either direction, testing of the user's water distribution system for the presence of a cross connection with a private water source can be performed. If such cross connection is present, it will cause an increase in pressure of the water in the internal chamber 25 of the pressure sensing body 18 and a corresponding indication of the increased pressure by the pressure measuring gauge 20.

On the other hand, with the tubular spindle 22 located at the inner position, the outer end 22C thereof is retracted a sufficient distance into the one end 18A A of the presssure sensing body 18 to not contact the one-way flow control valve 16 and thus leave it at the closed state in response to the act of attaching the pressure sensing body 18 to the one-way flow control valve 16 via the section of external threads 34 and the coupling nut 44. With the one-way flow control valve 16 allowed to remain closed, testing of the one-way flow control valve 16 for backflow leakage can be performed. If such backflow is occurring through the one-way flow control valve 16, it will also cause an increase in pressure of the water in the internal chamber 25 of the pressure sensing body 18 and a resultant indication of the increased pressure by the pressure measuring gauge 20.

Referring to FIGS. 2 and 3, there is illustrated a second embodiment of the testing apparatus 10 of the present invention. The testing apparatus 10 of the second embodiment includes the same basic components as illustrated in the first embodiment of FIG. 1 and as described above except for the following modifications and additions.

In one modification of the second embodiment of the testing apparatus 10 shown in FIGS. 2 and 3 compared to the first embodiment thereof in FIG. 1, a third internal attachment means in the form of a third section of internal threads 50 is defined through a side portion of the pressure sensing body 18 between and spaced from the first and second sections of internal threads 28, 30 therein. The third section of internal threads 50 defined a passage 51 which is oriented in perpendicular relationship with the internal axial bore 24 of the pressure sensing body 18. The inner stem 38 of the pressure measuring gauge 20 is threaded into and mounted by the third section of internal threads 50 in this second embodiment of the testing apparatus 10.

Several additions are incorporated by the second embodiment of the testing apparatus 10 to enhance and expand the ability thereof for use in performing other tests on the end user's water distribution system. One addition is a pilot valve 52 attached to the pressure sensing body 18, The pilot valve 52 has a body 54 with a central passage 56 therethrough, a valve stem 58 rotatably mounted through the body 54 in a transverse relationship across the passage 56, and a pair of externally threaded fittings 54A, 54B extending from opposite ends of the body 54. The valve stem 58 has a handle 58A to grip and use to turn the valve stem 58 between opened and closed positions to correspondingly unblock and block flow of water through the passage 56. The pilot valve 52 is attached to the pressure sensing body 18 by its one threaded fitting 54A being threaded into the second section of internal threads 30 at the other end 18B of the pressure sensing body 12.

Another addition is a supply source adapter 60. The supply source adapter has a cylindrical body 61 with an internal bore 62 therethrough and first and second internal attachment means in the form of first and second sections of internal threads 64, 66 formed therein. The first section of internal threads 64 extends from an open end 61A of the adapter body 61, and the second section of internal threads 66 extends through a side portion of the adapter body 61 at a right angle to and intersecting with the internal bore 62. The adapter body 61 also has an external attachment means in the form of a section of external threads 68 formed about the one end 61A of the adapter body 61 for use in attaching the adapter body 61 via a coupling nut 70, as represented by the dashed lines in FIG. 3, with the conduit 14 of the public water supply at the upstream side of the meter setter 12, as also see in FIG. 5. The supply source adapter 60 also includes a threaded fitting 72 threaded into the second section of internal threads 66 in the adapter body 11. The final addition is a flexible elongated hose 74 having internally threaded end couplings 76, 78 rotatably mounted to the opposite ends thereof for threadably attaching the hose 74 between the threaded fitting 54B on the pilot valve 52 and the threaded fitting 72 on the adapter body 61.

With the above-described additional components, the second embodiment of the testing apparatus 10 can be used to perform several other tests. The user's water distribution system can be check for leaks by first opening the pilot valve 52 to introduce water into the internal chamber 25 from the public water supply through the flexible hose 74 and supply source adapter 60. This charges the chamber 25 with water under pressure. Then, the pilot valve 52 is closed. The pressure measuring gauge 20 is then monitored for a few minutes. If the pressure indicated thereon stays stable, this indicates that there is no leakage from the user's water distribution system downstream of the location of the meter setter 12 since no usage of water is drawn.

To perform the cross connection test previously described, the user is requested to turn on the pump to a private water source, such as a well. If the pressure measuring gauge 20 begins to indicate an increased pressure reading, then this is visual proof that the private water source is cross connected to the public water source.

Then, to perform the flow control valve test previously described, an angle valve (not shown) on conduit 14 is closed to shut off inflow of water from the public water supply and the flexible hose 74 is removed. The pilot valve 52 is then opened. If a small amount of water drains from the internal chamber 25 of the pressure sensing body 18 out through the pilot valve 52 and immediately discontinues, then that means that the one-way flow control valve 16 is not leaking.

Referring to FIG. 4, there is illustates an alternative embodiment to relocate actuating means 22 between the outer and inner displaced positions relative to the pressure sensing body 18 and the one-way flow control valve 16. In this embodiment, the actuating means 22 includes a series of tubular members 80 of different lengths. Instead of using a threaded spindle 22, as shown in FIGS. 1 and 2, for relocating the outer end 22C of the spindle 22 to the desired distance from the pressure sensing body 18 to make or not make contact with the one-way flow control valve 16, now the one of the tubular members 80 having the correct length to perform the desired action will be selected and inserted into the axial bore 24 of the pressure sensing body 18.

The above-described first and second embodiments of the testing apparatus 10 of the present invention are versatile in the various ways they can be used to assist an inspector in performing the different tests necessary to thoroughly monitor and test a residential or end user water distribution system. Furthermore, all test procedures are focused at the location of the user's meter setter 12. These different tests include: (1) monitoring direct pressure; (2) adjusting pressure on service pressure regulators; (3) testing for faulty pressure regulator valves; (4) adjusting and monitoring down steam pressure; (5) testing the single one-way flow control valve of a meter setter; and (6) testing for cross connections beween public water supplies and private water well supplies.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A testing apparatus for use in testing the condition of a local water distribution system at a site of an end user, said testing apparatus to be used between upstream and downstream sides of a meter setter which is connected at the upstream side thereof to a public water supply and at the downstream side thereof to the local water distribution system of the end user via a one-way flow control valve, said testing apparatus comprising:

(a) a pressure sensing body having an internal chamber for receiving and containing water under pressure, said body also having an end with attachment means adapted to attach said pressure sensing body to the one-way flow control valve to provide communication with the local water distribution system of the end user via the one-way flow control valve at the downstream side of the meter setter;

(b) a pressure measuring gauge mounted to said pressure sensing body and connected in communication with said internal chamber therein, said pressuring measuring gauge being adapted to sense and indicate the pressure of water received and contained in said internal chamber of said pressure sensing body; and (c) an actuating member having a passageway therethrough to provide communication between an end portion of said actuating member and said internal chamber of said pressure sensing body, said actuating member having attachment means mounting said actuating member to said pressure sensing body to undergo movement of said actuating member between outer and inner position relative to said pressure sensing body such that movement of said actuating member to said outer position causes an end portion of said actuating member to force the one-way flow control valve from a closed state to an opened state in response to attachment of said pressure sensing body to the one-way flow control valve and thereby facilitate testing of the user's water distribution system for a cross connection with a private water source which, if present, would cause an increase in pressure of water in said internal chamber of said pressure sensing body and a corresponding indication by said pressure measuring gauge, whereas movement of said actuating member to said inner position causes said end portion of said actuating member to leave the one-way flow control valve at the closed state in response to attachment of said pressure sensing body to the one-way flow control valve and thereby facilitate testing of the one-way flow control valve for backflow leakage which, if present, also would cause an increase in pressure of water in said internal chamber of said pressure sensing body and a corresponding indication by said pressure measuring gauge.

2. The apparatus of claim 1 wherein said pressure sensing body has a continuous internal wall surface defining an axial bore therein forming said internal chamber in said pressure sensing body.

3. The apparatus of claim 2 wherein said pressure sensing body has axially spaced sections of internal threads formed on and extending about said internal wall surface adjacent to said open opposite ends of said body.

4. The apparatus of claim 1 wherein said attachment means is a section of external threads formed on and extending about said body adjacent to said one end.

5. The apparatus of claim 1 wherein said pressure measuring gauge includes an outer gauging mechanism having a face with a graduated scale printed thereon and a pointer mounted to rotate relative to said graduated scale-and point at a portion of said scale representing the magnitude of the pressure measured by said gauge.

6. The apparatus of claim 5 wherein said pressure measuring gauge also includes an inner hollow stem connected in communication with said internal chamber of said pressure sensing body, said outer gauging mechanism being mounted at an outer end of said inner stem, said inner hollow stem having an internal passage extending between said internal chamber of said pressure sensing body and said outer gauging mechanism so as to provide communication therebetween, said inner stem having an attachment means thereon attaching said inner stem to said pressure sensing body.

7. The apparatus of claim 6 wherein said attachment means on said inner stem is a section of external threads being threaded with said second section of internal threads formed in said pressure sensing body adjacent to said other end thereof.

8. The apparatus of claim 7 wherein said second section of internal threads in said pressure sensing body and said inner stem of said gauge and said section of external threads thereon are oriented in a coaxial relationship with an axial bore through said pressure sensing body forming said internal chamber.

9. The apparatus of claim 7 wherein said second section of internal threads in said pressure sensing body and said inner stem of said gauge and said second of external threads thereon are oriented in a perpendicular relationship to an axial bore through said pressure sensing body forming said internal chamber.

10. The apparatus of claim 1 wherein said actuating member is an elongated tubular spindle and said passageway of said actuating member is an axial passageway formed through said tubular spindle, said tubular spindle having an attachment formation formed on and extending about an inner portion of said spindle such that by turning said spindle an outer portion thereof axially extends from and retracts into said pressure sensing body between said outer and inner positions.

11. The apparatus of claim 10 wherein said pressure measuring gauge includes an outer gauging mechanism having a face with a graduated scale printed thereon and a pointer mounted to rotate relative to said graduated scale and point at a portion of said scale representing the magnitude of the pressure measured by said gauge.

12. The apparatus of claim 11 wherein said pressure measuring gauge also includes an inner hollow stem connected in communication with said internal chamber of said pressure sensing body, said outer gauging mechanism being mounted at an outer end of said inner stem, said inner hollow stem having an internal passage extending between said internal chamber of said pressure sensing body and said outer gauging mechanism so as to provide communication therebetween, said inner stem having an attachment means thereon attaching said inner stem to said pressure sensing body.

13. The apparatus of claim 1 wherein said actuating member is one of a series of tubular members of different lengths such that said actuating member is moved between said outer and inner positions by selecting the one of said tubular members having a length that corresponds to the distance between said outer and inner positions.

14. The apparatus of claim 13 wherein said pressure measuring gauge includes an outer gauging mechanism having a face with a graduated scale printed thereon and a pointer mounted to rotate relative to said graduated scale and point at a portion of said scale representing the magnitude of the pressure measured by said gauge.

15. The apparatus of claim 14 wherein said pressure measuring gauge also includes an inner hollow stem connected in communication with said internal chamber of said pressure sensing body, said outer gauging mechanism being mounted at an outer end of said inner stem, said inner hollow stem having an internal passage extending between said internal chamber of said pressure sensing body and said outer gauging mechanism so as to provide communication therebetween, said inner stem having an attachment means thereon attaching said inner stem to said pressure sensing body.

16. The apparatus of claim 1 further comprising:
a pilot valve attached to one end of said pressure sensing body, said pilot valve having a body with a central passage therethrough connected in communication with said internal chamber of said pressure sensing body and a rotatable element mounted to said body of said pilot valve and extending across said passage and being rotatable relative to said body so as to block and unblock flow through said passage; and
means for flexibly interconnecting said pilot valve to the public water supply such that by operation of the rotatable element of said pilot valve said internal chamber of said pressure sensing body is charged with water under pressure from the public water supply and then isolated therefrom.

17. The apparatus of claim 16 wherein said flexible interconnecting means includes a supply source adapter attachable to the public water supply and a section of flexible hose for connection between said adapter and said pilot valve.

18. The apparatus of claim 16 wherein said actuating member is an elongated tubular spindle and said passageway of said actuating member is an axial passageway formed through said tubular spindle, said tubular spindle having an attachment formation formed on and extending about an inner portion of said spindle such that by turning said spindle an outer portion thereof axially extends from and retracts into said pressure sensing body between said outer and inner positions.

19. The apparatus of claim 16 wherein said pressure measuring gauge includes an outer gauging mechanism having a face with a graduated scale printed thereon and a pointer mounted to rotate relative to said graduated scale and point at a portion of said scale representing the magnitude of the pressure measured by said gauge.

20. The apparatus of claim 16 wherein said actuating member is a selected one of a series of tubular members of different lengths such that said actuating member is moved between said outer and inner positions by selecting the one of said tubular members having a length that corresponds to the distance between said outer and inner positions.

* * * * *